(12) United States Patent
Yui et al.

(10) Patent No.: US 6,673,919 B2
(45) Date of Patent: Jan. 6, 2004

(54) CHEMICALLY MODIFIED HYALURONIC ACID OR SALTS THEREOF, AND A PROCESS FOR PRODUCING THEREOF

(75) Inventors: Nobuhiko Yui, 4-103, Matsugaoka, Tatsunokuchi-machi, Nomi-gun, Ishikawa-ken (JP); Tooru Ooya, Ishikawa-ken (JP); Ikuo Sato, Kanagawa-ken (JP)

(73) Assignees: Chisso Cororation, Osaka (JP); Nobuhiko Yui, Ishikawa-ken (JP)

( * ) Notice: Subject to any disclaimer, the term of this patent is extended or adjusted under 35 U.S.C. 154(b) by 0 days.

(21) Appl. No.: 10/107,195

(22) Filed: Mar. 28, 2002

(65) Prior Publication Data

US 2002/0143171 A1 Oct. 3, 2002

(30) Foreign Application Priority Data

Mar. 30, 2001 (JP) ........................................ 2001-100427

(51) Int. Cl.$^7$ ............................................... C08B 37/00
(52) U.S. Cl. ..................... 536/124; 536/55.1; 536/1.11; 536/55.2; 536/55.3; 536/18.7; 514/53; 514/54
(58) Field of Search .................... 514/53, 54; 536/55.1, 536/1.11, 123.1, 124, 18.7, 55.2, 55.3

(56) References Cited

U.S. PATENT DOCUMENTS

| | | | | | |
|---|---|---|---|---|---|
| 5,462,976 A | * | 10/1995 | Matsuda et al. | ............... | 522/74 |
| 5,644,049 A | * | 7/1997 | Giusti et al. | .................. | 536/53 |
| 5,679,657 A | * | 10/1997 | Oka et al. | ..................... | 514/54 |

FOREIGN PATENT DOCUMENTS

WO          WO 97/18244          5/1997

OTHER PUBLICATIONS

Yui et al., Pharmaceutical Preparation for the Treatment of Gynecological Diseases, U.S. application No. 10/108,298, filed Mar. 28, 2002, pending.

* cited by examiner

Primary Examiner—James O. Wilson
Assistant Examiner—Ganapathy Krishnan
(74) Attorney, Agent, or Firm—Leydig, Voit & Mayer, Ltd.

(57) ABSTRACT

This invention relates to a chemically modified hyaluronic acid and salts thereof, which are obtained by O-acylating, alkoxylating or crosslinking a complex consisting of hyaluronic acid or a salt thereof and a cationic compound in a nonaqueous solvent, and a process for the production thereof. The nonaqueous solvent used in the invention is preferably one or more solvents selected from the group consisting of chloroform, toluene, methylene chloride and heptane.

10 Claims, No Drawings

US 6,673,919 B2

CHEMICALLY MODIFIED HYALURONIC ACID OR SALTS THEREOF, AND A PROCESS FOR PRODUCING THEREOF

FIELD OF THE INVENTION

This invention relates to a chemically modified hyaluronic acid and salts thereof, and a process for producing them. More specifically, the invention relates to a chemically modified hyaluronic acid and salts thereof, which are obtained by O-acylating, alkoxylating or crosslinking a complex consisting of hyaluronic acid or salts thereof and a cationic compound in a nonaqueous solvent, and a process for the production thereof.

BACKGROUND OF THE INVENTION

Hyaluronic acid is a straight-chain polysaccharide with a high molecular weight which is an alternating copolymer of N-acetyl-D-glucosamine and D-glucuronic acid. Since hyaluronic acid and a salt thereof have a large number of free carboxyl groups and free hydroxyl groups, they are hydrophilic and can be dissolved in an optional amount of water to form an aqueous solution with a high viscosity. It has been expected that hyaluronic acid derivatives having different physical properties are obtained by hindering the free carboxyl groups and/or the free hydroxyl groups.

For applications in the fields of medicine, foodstuffs, cosmetic and the like, the chemical modification of hyaluronic acid or a salt thereof has been carried out in an aqueous solvent or a hydrophilic organic solvent (see e.g. JP-A 7-309902 and JP-A 8-53501).

In the prior art, organic reactions applicable to the chemical modification of hyaluronic acid or a salt thereof has been limited, because the reactions are performed in the presence of water. In the presence of water, hyaluronic acid or a salt thereof is depolymerized by an active oxygen such as a hydroxy radical or the like generated during the reaction to reduce the molecular weight of hyaluronic acid or a salt thereof. Consequently, there is a problem that the reduction in molecular weight may adversely affect essential properties of hyaluronic acid or a salt thereof, e.g. moisturizing action, high viscosity and the like owing to high molecular weight thereof. Further, there is a problem of contamination with or production of a pyrogen and an antigenic substance arising from water and/or the hyaluronate as a raw material. For the production of modified hyaluronate, it has been necessary not only to remove the pyrogen and antigenic substance from the raw materials and/or the modified hyaluronate, but also to pay attention to the prevention of the contamination with the pyrogen and antigenic substance (JP-A 11-512778, WO97/18244).

DISCLOSURE OF THE INVENTION

An object of the invention is to provide a chemically modified hyaluronic acid or a salt thereof in the absence of water and a process for the production thereof.

We have zealously studied to solve the problems of the prior art and found that the modified hyaluronic acid or a salt thereof can be prepared by dissolving a complex of the hyaluronate and a cationic compound in a nonaqueous solvent and then O-acylating, alkoxylating or crosslinking the complex to afford the chemically modified hyaluronate in which the reduction in molecular weight is prevented and the properties of the hyaluronate such as the moisturizing action and the high viscosity are maintained. We have also found that the contamination with or the generation of a pyrogen or an antigenic substance in the final product can be considerably decreased and thus have completed the present invention.

The hyaluronic acid and salts thereof according to the invention are defined in the following items (1) to (9).

(1) A chemically modified hyaluronic acid or a salt thereof, which is prepared by O-acylating, alkoxylating or crosslinking a complex consisting of hyaluronic acid or a salt thereof and a cationic compound in a nonaqueous solvent.
(2) The chemically modified hyaluronic acid or a salt thereof as defined in item (1), wherein the cationic compound is a quaternary ammonium salt.
(3) The chemically modified hyaluronic acid or a salt thereof as defined in item (1), wherein the nonaqueous solvent is one or more solvents selected from the group consisting of chloroform, toluene, methylene chloride and heptane.
(4) The chemically modified hyaluronic acid or a salt thereof as defined in item (1), in which an amount of a pyrogen and/or an antigenic substance is reduced by O-acylating, alkoxylating or crosslinking in the nonaqueous solvent.
(5) The chemically modified hyaluronic acid or a salt thereof as defined in item (4), wherein the amount of the pyrogen is not more than 0.05 endotoxin unit (EU)/mg.
(6) The chemically modified hyaluronic acid or a salt thereof as defined in item (1), in which the O-acylating reaction is a reaction with an organic acid employing at least one acid catalyst selected from the group consisting of mineral acids, organic acids and Lewis acids, a reaction with an organic acid employing at least one dehydrating agent selected from the group consisting of N,N'-dicyclohexylcarbodiimide, 2-chloro-1-methyl pyridiniumiodide and N,N'-carbonyl diimidazole, or an O-acylation employing an acid anhydride or an acid halide in the presence of an acid binder.
(7) The chemically modified hyaluronic acid or a salt thereof as defined in item (1), in which the alkoxylating reaction is an alkoxylation using an alkyl halide or an alkoxide in the presence of an acid binder, or an alkoxylation by the dehydration of hydroxyl groups using Brönsted acid or Lewis acid as an acid catalyst.
(8) The chemically modified hyaluronic acid or a salt thereof as defined in item (1), in which the crosslinking reaction comprises irradiating a certain wavelength of light to the chemically modified hyaluronic acid or a salt thereof to which a photoreactive group is introduced.
(9) The chemically modified hyaluronic acid or a salt thereof as defined in item (1), in which the crosslinking reaction is a reaction using at least one crosslinking agent selected from the group consisting of polyfunctional aldehydes, polyfunctional epoxy compounds and polyhydric alcohols.

The processes for the production of hyaluronic acid and salts thereof according to the present invention are defined in the following items (10)–(18).

(10) A process for producing a chemically modified hyaluronic acid or a salt thereof, which comprises O-acylating, alkoxylating or crosslinking a complex consisting of hyaluronic acid or a salt thereof and a cationic compound in a nonaqueous solvent.
(11) The process as defined in item (10), wherein the cationic compound is a quaternary ammonium salt.
(12) The process as defined in item (10), wherein the nonaqueous solvent is one or more solvents selected from the group consisting of chloroform, toluene, methylene chloride and heptane.

(13) The process as defined in item (10), wherein an amount of a pyrogen and/or an antigenic substance in the chemically modified hyaluronic acid or salts thereof is decreased by O-acylating, alkoxylating or crosslinking the complex in the nonaqueous solvent.

(14) The process as defined in item (13), wherein the amount of the pyrogen is not more than 0.05 EU/mg.

(15) The process as defined in item (10), in which the O-acylating reaction is a reaction with an organic acid employing at least one acid catalyst selected from the group consisting of mineral acids, organic acids and Lewis acids, a reaction with an organic acid employing at least one dehydrating agent selected from the group consisting of N,N'-dicyclohexylcarbodiimide, 2-chloro-1-methyl pyridiniumiodide and N,N'-carbonyl diimidazole, or an O-acylation employing an acid anhydride or an acid halide in the presence of an acid binder.

(16) The process as defined in item (10), in which the alkoxylating reaction is an alkoxylation using an alkyl halide or an alkoxide in the presence of an acid binder, or an alkoxylation by the dehydration of hydroxyl groups using Brönsted acid or Lewis acid as an acid catalyst.

(17) The process as defined in item (10), in which the crosslinking reaction comprises irradiating a certain wavelength of light to the chemically modified hyaluronic acid or a salt thereof into which one or more photoreactive groups have been introduced.

(18) The process as defined in item (10), in which the crosslinking reaction is a reaction using at least one crosslinking agent selected from the group consisting of polyfunctional aldehydes, polyfunctional epoxy compounds and polyhydric alcohols.

The process for producing the hyaluronic acid or a salt thereof according to the invention is characterized in that degradation or depolymerization of hyaluronic acid or a salt thereof during the modification process can be prevented, i.e. the reduction in molecular weight of hyaluronic acid or a salt thereof can be considerably prevented.

Furthermore, the present invention relates to the methods for decreasing an amount of a pyrogen and/or an antigenic substance in a chemically modified hyaluronic acid or salts thereof, which are defined in the following items (19)–(20).

(19) A method for reducing an amount of a pyrogen and/or an antigenic substance in a chemically modified hyaluronic acid or salts thereof, characterized in that a complex consisting of hyaluronic acid or a salt thereof and a cationic compound is O-acylated, alkoxylated or crosslinked in a nonaqueous solvent to produce the chemically modified hyaluronic acid or salts thereof.

(20) The method as defined in item (19), wherein the amount of the pyrogen is not more than 0.05 EU/mg.

The present invention also relates to use of the chemically modified hyaluronic acid or salts thereof for preparing pharmaceuticals, cosmetics or foodstuffs, characterized in that the chemically modified hyaluronic acid or salts thereof prepared by the process according to the invention is used as a carrier. Particularly, the chemically modified hyaluronic acid or salts thereof, preferably pharmaceutically acceptable salts, according to the invention are useful for manufacturing the sustained release preparations or a pharmaceutical carrier.

BEST MODE FOR CARRYING OUT THE INVENTION

Hyaluronic acid or a salt thereof employed in this invention may be, but not limited to, various animal tissues such as a tissue of comb or microorganisms which are capable of producing hyaluronic acid. Preferable is the hyaluronate derived from the microorganisms. Examples of the microorganisms capable of producing hyaluronic acid may include *Streptococcus pyogenes, Streptococcus equisimilis, Streptococcus equi, Streptococcus dysgalactiae, Streptococcus zooepidemicus* and the like.

An average molecular weight of hyaluronic acid or a salt thereof used in the present invention as a raw material, which is measured by a HPLC method, is at least 10,000, preferably more than 100,000, more preferably in the range of 500,000 to 1,500,000. The average molecular weight of the hyaluronates can be measured by HPLC using any column suitable for measuring molecular weight of polysaccharides. The column employed in the invention is preferably Shodex Ionpak KS806 and Ionpak KS-G or the like. In these cases, an aqueous solution of sodium chloride (0.2 mol/L) may be used as an eluant, the column is run off at a flow rate 1.0 mL/min. and hyaluronic acid or a salt thereof can be detected by the absorbance at 206 nm. The average molecular weight can be calculated with the aid of a calibration curve prepared using sodium hyaluronate of which the molecular weight is already known.

Examples of the cationic compound used in the present invention may include quaternary ammonium salts, amino acids having two or more amino groups, peptides, salts of polyamino acids, salts of sugars having two or more amino groups, preferably quaternary ammonium salts.

The quaternary ammonium salts wherein at least one alkyl group has not less than 8 carbon atoms can be used in the present invention. Examples of the quaternary ammonium salts include distearyldimethylammonium chloride, dioleyldimethylammonium chloride, cetylpyridinium chloride, cetyltrimethylammonium chloride, cetyltrimethylammonium bromide, ditetradecyldimethylammonium bromide, didodecyldimethylammonium bromide, didecyldimethylammonium bromide, octadecyltrimethylammonium chloride, n-octadecyltrimethylammonium bromide, tridodecylmethylammonium chloride, trioctylmethylammonium bromide, dioctanoyl L-α-phosphatidylcholine, dilauroyl L-α-phosphatidylcholine, dipalmitoyl D,L-α-phosphatidylcholine, 1,2-dimyristoyl-3-trimethylammonium propane, 1,2-dioleoyl-3-trimethylammonium propane, 1,2-dipalmitoyl-3-trimethylammonium propane, 1,2-distearoyl-3-trimethylammonium propane, benzalkonium chloride, benzethonium chloride and the like.

In the specification, the complex consisting of the hyaluronate and the cationic compound means a complex in which an anionic moiety such as a carboxyl group of hyaluronic acid or a salt thereof and the cationic compound form ionic bond. An example of method for preparing the complex is illustrated below.

<Preparation of a Complex Consisting of the Hyaluronate and the Cationic Compound>

(A) The hyaluronate is dissolved in distilled water or purified water corresponding thereto at the concentration in the range of 0.01% to 10%, preferably 0.05% to 1%. In the present invention, "purified water corresponding to distilled water" means water purified with, for example, by the electric deionization and the reverse osmosis procedures.

(B) The cationic compound to be complexed with the hyaluronate, preferably the quaternary ammonium salt is added and dispersed in distilled water or corresponding purified water.

The solution of the hyaluronate prepared in (A) and the solution of the cationic compound prepared in (B) are mixed so that the molar ratio of the cationic group in the cationic compound to the carboxyl group in the hyaluronate is in the range of 0.5–5:1, preferably 0.7–1.5:1, for example, 1:1. The mixing may be performed at room temperature. Preferably, both the solutions are heated up to the gel-liquid crystal transition point temperature of the cationic compound and mixed at an temperature equal or higher than that temperature.

The insoluble product obtained by the mixing can be recovered from the mixture by a separation method conventionally employed in the art, for example, centrifugation, suction filtration, pressure filtration or the like. The insoluble product recovered is washed with distilled water or corresponding purified water which has been heated up to the gel-liquid crystal transition point temperature or higher and then subjected to drying. The drying can be carried out by means of any drying procedure conventionally employed in the art, e.g. atmospheric drying, vacuum drying, freeze drying or the like.

Examples of the nonaqoueus solvents include chloroform, methylene chloride, toluene, heptane, ethanol, methanol, propylene glycol, ethylene glycol, dimethylformamide (DMF), dimethyl sulfoxide (DMSO), tetrahydrofuran (THF) and a mixed solvent thereof. Preferable is chloroform, methylene chloride, toluene, heptane or a mixed solvent thereof. The concentration of the complex consisting of the hyaluronate and the cationic compound is preferably in the range of 1 to 1000 mmol/L, but not limited thereto.

Examples of the O-acylation in the present invention may include (1) a reaction with an organic acid employing one or more acid catalysts, for example mineral acids such as hydrochloric acid or sulfuric acid, organic acids such as aromatic sulfonic acid and Lewis acids such as boron fluoride etherate or the like, (2) a reaction with an organic acid employing one or more dehydrating agents, for example, N,N'-dicyclohexylcarbodiimide, 2-chloro-1-methyl pyridiniumiodide and N,N'-carbonyl diimidazole or the like, and (3) an O-acylation employing an acid anhydride or an acid halide, e.g. the Schotten-Baumann method in the presence of an acid binder such as sodium acetate, triethylamine, pyridine, 4-dimethylamino pyridine or the like.

For instance, when the o-acrylation is acetylation to prepare acetylated hyaluronate, the complex of the hyaluronate and the cationic compound as obtained above is dissolved or suspended in toluene and suitable amounts of acetic anhydride and pyridine are added thereto. This mixture is allowed to react for two hours at room temperature with stirring and the reaction is stopped by adding methanol. The resulting gel substance is isolated by filtration and then washed with methanol. The isolated gel is dried at approximately 50° C. in a vacuum dryer to give the acetylated hyaluronate.

Examples of the alkoxylation in the invention may include (1) a reaction using an alkyl halide and an alkoxide, e.g. the Williamson reaction and (2) a dehydration of hydroxyl groups using Brönsted acid or Lewis acid as an acid catalyst.

For instance, when the alkoxylation is benzylation to prepare a benzyl hyaluronate, the complex of the hyaluronate and the cationic compound as obtained above is dissolved in toluene and benzyl halide and sodium hydride are added thereto. This mixture is refluxed by heating. The resulting gel substance is isolated by filtration and then washed with heptane and water. The isolated gel is dried at approximately 50° C. in a vacuum dryer to give the benzyl hyaluronate.

In the present invention, the crosslinking reaction can be performed by any crosslinking method known in the art. Preferable examples of the crosslinking reaction may include crosslinking reactions using as a crosslinking agent polyfunctional aldehydes such as glutaraldehyde and terephthalaldehyde, polyfunctional epoxy compounds such as epichlorohydrin, 1,2-bis(2,3-epoxypropoxy)ethane, ethyleneglycol diglycidyl ether or polyhydric alcohols such as ethylene glycol and propylene glycol; and photocrosslinking reactions, but not limited thereto.

The photocrosslinking can be carried out by any photocrosslinking reaction known in the art. Preferable is a crosslinking by irradiating a certain wavelength of light to the chemically modified hyaluronate to which photoreactive groups have been introduced. Examples of compounds useful for introducing photoreactive groups may include cinnamic acid or a salt thereof, thymine, coumarin and derivatives thereof, but not limited thereto.

When the photoreactive group is cinnamate group, the complex of the hyaluronate and the cationic compound as obtained above is dissolved in DMF and suitable amounts of cinnamate halide and pyridine are added thereto. This mixture is allowed to react at 60° C. with stirring and the reaction is stopped by adding methanol. The resulting precipitation is isolated by the filtration, washed with methanol and then dried at approximately 50° C. in a vacuum dryer to give cinnamated hyaluronate. This product is dissolved in DMF or water and is subjected to the ultraviolet radiation at a wavelength of 290 nm or higher to give the crosslinked hyaluronate.

The chemically modified hyaluronate according to the invention is characterized in that the reduction in molecular weight thereof during the preparation process is considerably decreased in comparison with the modified hyaluroantes prepared by the processes of the prior art. The average molecular weight of the modified hyaluronate prepared by the present invention varies depending on an average molecular weight of a hyaluronate as a raw material and/or the reaction conditions. For instance, where a hyaluronate having an average molecular weight of 500,000 to 1,500,000 is employed as a raw material, the average molecular weight of the modified hyaluronate of the invention is a not less than approximately 20%, preferably not less than 50% of the average molecular weight of the raw material.

The chemically modified hyaluronates according to the present invention are usable as a material for the pharmaceuticals, the foodstuffs, the cosmetics or the like, but not limited thereto. They are particularly useful for the medical application, for example as a moisturizing agent, a smoothing agent, a wound covering material, a material of drug delivery system (DDS) or the like, because the chemically modified hyaluronates which are prepared by the nonaqueous reaction contain a reduced amount of the contaminants such as a pyrogen, an antigenic substance or the like and are metabolizable in the body. Especially, it is expected that the degradation rate of the modified hyaluronates in uterus highly correlates with the biorhythm of the human body or uterus and thus the modified hyaluronates according the present invention are significantly useful as a device for intrauterine or intervaginal transplantation material which supports a therapeutic agent, e.g. an agent for endometriosis.

EXAMPLES

The present invention is concretely illustrated by the following Examples and Comparative Examples, to which the invention is not limited.

Example 1

Preparation of Acetylated Hyaluronate

In 300 mL of purified water, 1.8 g of sodium hyaluronate (CHA, an average molecular weight: 1,000,000, Chisso corp.; hereinafter referred to as "CHA") was dissolved. Separately, 2.47 g of distearyldimethylammonium chloride (hereinafter referred to as "DSC") was suspended in 560 mL of purified water. Both the solution and the suspension were heated up to 45° C. After heating, these were mixed with stirring and the stirring was continued for 5 minutes. The resultant complex was recovered by centrifuging at 5,000 rpm at room temperature and washed with warm water at 45° C. After washing, the complex was freeze-dried overnight and further vacuum-dried at 50° C. overnight to give 3.3 g of CHA-DSC complex. Yield: 85%.

The obtained CHA-DSC complex (2.0 g) was suspended in the mixed solvent consisting of 30 mL of toluene, 223 mg of acetic anhydride and 340 mg of pyridine and then the suspension was stirred for two hours at room temperature. 100 mL of methanol was added thereto under ice-cooling. Then, the resultant precipitate was recovered by filtration and washed with methanol. After washing, the product was vacuum-dried at 50° C. overnight to give 0.9 g of acetylated hyaluronate.

Existence of the acetyl group was confirmed by IR analysis. Further, NMR analysis revealed that the content of the introduced acetyl group is 1.3 per disaccharide unit of hyaluronic acid. The average molecular weight measured by the HPLC method is 500,000.

The amount of pyrogen in the modified hyaluronate was determined as a content of endotoxin with the aid of Toxicolor system ES-6 and ET-2 sets (Seikagaku corp.). Consequently, the amount of the pyrogen in CHA as a raw material is 0.2 EU/mg, whereas the amount of the pyrogen in the acetylated hyaluronate is 0.02 EU/mg.

Example 2

Photocrosslinking of Cinnamated Hyaluronate

In 300 mL of purified water, 1.8 g of sodium hyaluronate (CHA) was dissolved. Separately, 2.47 g of DSC was suspended in 560 mL of purified water. Both the solution and the suspension were heated up to 45° C. After heating, these were mixed with stirring and the stirring was continued for 5 minutes. The resultant complex was recovered by centrifuging at 5,000 rpm at room temperature and washed with warm water at 45° C. After washing, the complex was freeze-dried overnight and further vaccum-dried at 50° C. overnight to give 3.3 g of CHA-DSC complex. Yield: 85%.

The obtained CHA-DSC complex (928 mg) was dissolved in 30 mL of DMF at 60° C. with stirring. To the solution were added 1670 mg of cinnamoyl chloride and 790 mg of pyridine and the solution was stirred for two hours at 60° C. Then, 150 mL of methanol was added to the solution to stop the reaction and afford the precipitation. The precipitate was recovered by filtration and washed with methanol, and then vacuum-dried at 50° C. overnight to give 40 mg of the product. NMR analysis revealed that the content of the introduced cinnamate group is 1.3 per disaccharide unit of hyaluronic acid.

Subsequently, 8.5 mg of the product was dissolved in 0.17 mL of DMF and the ultraviolet irradiation in which a wavelength of less than 290 nm is eliminated was carried out using the high pressure mercury lamp with 500W. Then, the solvent was substituted by water to give the gel substance, i.e. 250 mg of the photocrosslinked hyalruronate.

Comparative Example 1

Preparation of Acetylated Hyaluronate

In a mixed solution of 5 mL of acetic acid and 20 mL of acetic anhydride, 1.5 g of sodium hyaluronate (CHA) was dissolved and 1 mL of concentrated sulfuric acid was gradually added thereto. After stirring for 60 minutes at room temperature, the mixture was poured into 500 mL of purified water to obtain a precipitate. The precipitate was recovered by centrifuging at 6,000 rpm at room temperature, washed twice with 500 mL of purified water and then dissolved in the mixed solution consisting of 2.25 g of 50% aqueous solution of sodium lactate and 62.5 mL of 80% acetone solution with stirring. To the solution was added 100 mL of acetone to obtain a precipitate. The precipitate was recovered by centrifuging at 6,000 rpm at 40° C. and washed twice with ethanol. The product was freeze-dried overnight and further vaccum-dried at 50° C. overnight to give the acetylated hyaluronate.

Existence of the acetyl group was confirmed by IR analysis. Further, NMR analysis revealed that the content of the introduced acetyl group is one per disaccharide unit of hyaluronic acid. The average molecular weight measured by the HPLC method is 50,000.

INDUSTRIAL APPLICABILITY

The chemically modified hyaluronic acid or a salt thereof according to the present invention have a sufficiently high average molecular weight and maintain the essential properties of hyaluronate, e.g. moisturizing action, high viscosity and the like, because the reduction of the high molecular weight thereof during the modification steps is prevented. Further, the chemically modified hyaluronic acid or a salt thereof according to the invention contain a reduced amount of pyrogen in comparison with hyaluronic acid or a salt thereof as a raw material.

Furthermore, the process for preparing the chemically modified hyaluronate according to the present invention can provide the modified hyaluronate having a high average molecular weight and prevent the contamination and production of a pyrogen.

What is claimed is:

1. A process for producing a chemically modified hyaluronic acid or a salt thereof, which comprises O-acylating, alkoxylating or crosslinking a complex consisting of hyaluronic acid or a salt thereof and a quaternary ammonium salt having at least one alkyl group with not less than 8 carbon atoms in a nonaqueous solvent.

2. The process as claimed in claim 1, wherein the nonaqueous solvent is one or more solvents selected from the group consisting of chloroform, toluene, methylene chloride and heptane.

3. The process as claimed in claim 1, wherein an amount of a pyrogen and/or an antigenic substance in the chemically modified hyaluronic acid or salt thereof is decreased by O-acylating, alkoxylating or crosslinking the complex in the nonaqueous solvent.

4. The process as claimed in claim 1, wherein the amount of the pyrogen is not more than 0.05 EU/mg.

5. The process as claimed in claim, 1, in which the O-acylating reaction is a reaction with an organic acid employing at least one acid catalyst selected from the group consisting of mineral acids, organic acids and Lewis acids, a reaction with an organic acid employing at least one dehydrating agent selected from the group consisting of N,N'-dicyclohexylcarbodiimide, 2-chloro-1-methyl pyridiniumiodide and N,N'-carbonyl diimidazole, or an O-acylation employing an acid anhydride or an acid halide in the presence of a base.

6. The process as claimed in claim 1, in which the alkoxylating reaction is an alkoxylation using an alkyl halide or an alkoxide in the presence of a base, or an alkoxylation by the dehydration of hydroxyl groups using Brönstead acid or Lewis acid as an acid catalyst.

7. The process as claimed in claim 1, in which the crosslinking reaction is a reaction using at least one crosslinking agent selected from the group consisting of polyfunctional aldehydes, polyfunctional epoxy compounds and polyhydric alcohols.

8. The process as claimed in claim 1, in which the crosslinking reaction comprises irradiating the chemically modified hyaluronic acid or a salt thereof into which a photoreactive group has been introduced by O-acylating or alkoxylating a complex consisting of hyaluronic acid or a salt thereof and a quaternary ammonium salt having at least one alkyl group with not less than 8 carbon atoms in a nonaqueous solvent, with a certain wavelength of light.

9. A method for reducing an amount of a pyrogen and/or an antigenic substance in a chemically modified hyaluronic acid or a salt thereof, wherein a complex consisting of hyaluronic acid or a salt thereof and a quaternary ammonium salt having at least one alkyl group with not less than 8 carbon atoms is O-acylated, alkoxylated or crosslinked in a nonaqueous solvent to produce a chemically modified hyaluronic acid or a salt thereof having a reduced amount of a pyrogen and/or an antigenic substance.

10. The method as claimed in claim 9, wherein the amount of the pyrogen is not more than 0.05 EU/mg.

* * * * *